United States Patent [19]

Jacquart

[11] 3,764,792

[45] Oct. 9, 1973

[54] METHOD AND APPARATUS FOR ADDING TWO DELTA CODED SIGNALS

[75] Inventor: Christian Augustin Jacquart, La Clapiere, Carros, France

[73] Assignee: International Business Machines Corporation, Armonk, N.Y.

[22] Filed: Dec. 15, 1971

[21] Appl. No.: 208,094

[30] Foreign Application Priority Data

Feb. 2, 1971 France .............................. 7104513

[52] U.S. Cl. ............ 235/168, 325/38 B, 179/15 AP

[51] Int. Cl. ............................................ G06f 7/385

[58] Field of Search ............. 325/38 R, 38 A, 38 B, 325/39; 179/15 AX, 15 AZ, 15 AP, 15 BW; 235/168; 328/159, 156, 157; 332/11 D; 340/347 DD; 178/DIG. 3

[56] References Cited

UNITED STATES PATENTS 3,666,890 5/1972 Wade ............................... 325/38 A

*Primary Examiner*—Charles D. Miller
*Attorney*—J. Jancin, Jr. et al.

[57] ABSTRACT

A method of adding two delta coded signals having the same binary bit rate. Whenever corresponding bits of two delta coded signals are to be added and both have the same binary value, a bit of this value is generated. Each time the bits of said two delta coded signals are different, a zero bit or a one bit is generated alternately. An adding circuit including two channels is disclosed to perform the method. One of the channels is constructed to provide a binary output signal when the bits of the delta coded signals are the same, and the other channel is constructed to provide a binary output signal when bits of the delta coded signals are different. The output of the two channels are combined to obtain the half-sum of the delta coded signals which can be used in digital recursive filtering techniques.

9 Claims, 2 Drawing Figures

INVENTOR
CHRISTIAN AUGUSTIN JACQUART

BY Karl O Hesse
AGENT

METHOD AND APPARATUS FOR ADDING TWO DELTA CODED SIGNALS

FIELD OF THE INVENTION

This invention relates to electrical transmission or interconnection systems including nonlinear solid state device circuits having plural diverse logic functions in general and more particularly, to a method and apparatus for adding two delta coded signals.

BACKGROUND OF THE INVENTION

The invention has particular utility when applied to digital recursive filtering techniques which are known in the prior art. Generally, these digital filtering techniques are implemented by sampling the analog signal to be filtered and encoding each sample into a sequence of digital pulses containing information as to the amplitude and phase of each sample. The digital pulses are then transmitted to a network which synthesizes (translates) the first pulse sequence into a second pulse sequence which represents the analog sample after being transformed by the filter transfer function. The translation is often performed digitally using a read-only memory. Whenever the analog sample is encoded into a serial sequence of digital bits, the translation network can be recursive digital filter including a read-only memory having a serial output which is combined with the serial digital representation of the sample prior to being reintroduced into the read-only memory for further translation. The read-only memory again contains the filter transfer function in the form of pulse responses chosen in such a way that the superposition of the successive time pulse responses received from a succession of digital bits representing a sample has the same mathematical form as the pulse response of the filter to the sample.

One inexpensive analog to digital encoding method of the prior art is delta encoding. Delta encoded signals require complex digital adding circuitry when applying delta encoding to digital recursive filters. This has been a major disadvantage.

When an analog signal is delta encoded, each digital bit represents the difference between the value of two successive analog samples of the analog signal. For example, where the amplitude of the analog signal is rising between samples, the output of the delta encoder will be digital one bits and where the amplitude of the analog signal is falling between samples, the output of the delta encoder will be digital zero bits. Thus, it can be seen that the information carried by a delta encoded digital bit is not the absolute value of the amplitude of the analog signal, but is rather an indication of an increase or a decrease. This means that when two delta coded signals are added, the sum of the two bits representing the changes of the two signals can assume any of three values:

increasing;
no change; and
decreasing.

Two methods of combining delta encoding signals are known in the prior art. One method results in an output signal having a rate equal to the bit rate of the input signals and three levels (−1, 0, +1). This is not compatible with binary circuits. The other method of combining two delta coded signals uses two bits to encode each of the three levels. This method is compatible with binary circuits, but results in an output signal having twice the bit rate of the input delta coded signals.

SUMMARY OF THE INVENTION

It is an object of this invention to combine two delta encoded signals in an improved manner.

It is a further object of this invention to combine two delta encoded signals in an improved manner to provide an output signal having the same bit rate as the two delta coded input signals being combined.

It is a still further object of this invention to combine two delta coded input signals in an improved manner to provide an output signal having binary amplitude level.

It is an even further object of this invention to combine two delta coded input signals to provide an output signal having the same binary amplitude level as the delta coded input signals.

The above objects are accomplished by generating a bit of the same value as the value of the time corresponding bits of the two delta coded signals to be added, each time said bits are of the same value, and generating alternately a one bit or a zero bit each time the bits of the two delta coded signals are different.

The adding circuit according to the invention comprises two channels both receiving the two delta coded signals to be added. The first channel comprises a memory device and is activated each time the bits of the two delta coded signals mismatch. It generates alternately a one bit and a zero bit according to the information present in the memory device which records the kind of bit generated at the preceding mismatch. The second channel is activated each time the bits of the two delta coded signals match, and both channels are connected to an output device generating the delta coded sum signal.

The foregoing and other objects, features and advantages of the invention will best be understood from the following more particular description of the preferred embodiment of the invention, as illustrated in the accompanying drawings.

IN THE DRAWINGS

GENERAL DESCRIPTION

The method of the invention is based upon the statistically high probability that there will be mismatch of two bits of two different signals in the succession of bits representative of the delta coding of those two signals. Though the sum of two corresponding bits of the delta coded signals to be added can assume three distinctive values corresponding respectively to an increase, a decrease or a no change, the method according to the invention codes only the values representative of the increases and decreases in the amplitude of the analog sum signal. The value representative of the no change condition is obtained when decoding the delta coded form of the sum signal by integration.

Whenever the time corresponding bits of the two delta coded signals are of different value, a one bit or a zero bit is alternately generated. The result will be, during the decoding integration process, that each of said zero bits generated over several bit times will cancel the effect of each of said one bits generated over the same bit times. This is equivalent to a no change condition, i.e., maintaining the level of the sum signal obtained by adding the two delta coded signals. Because the adding method of this invention, encodes no change conditions as alternating increase and decrease conditions, the encoding is accomplished by using binary bits according to the delta modulation rules previously explained.

Figure 1:
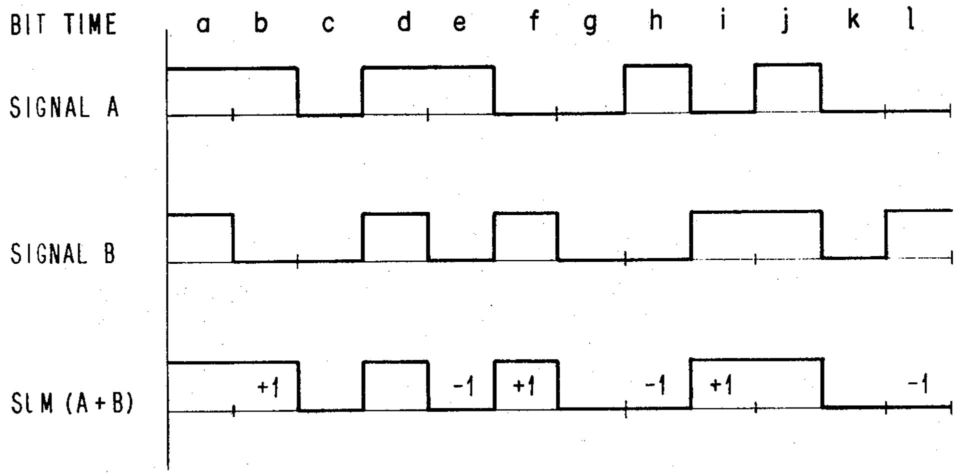
FIG. 1 shows two input delta coded signals A and B and the output delta coded sum signal S obtained by the method according to the invention.
Figure 2:
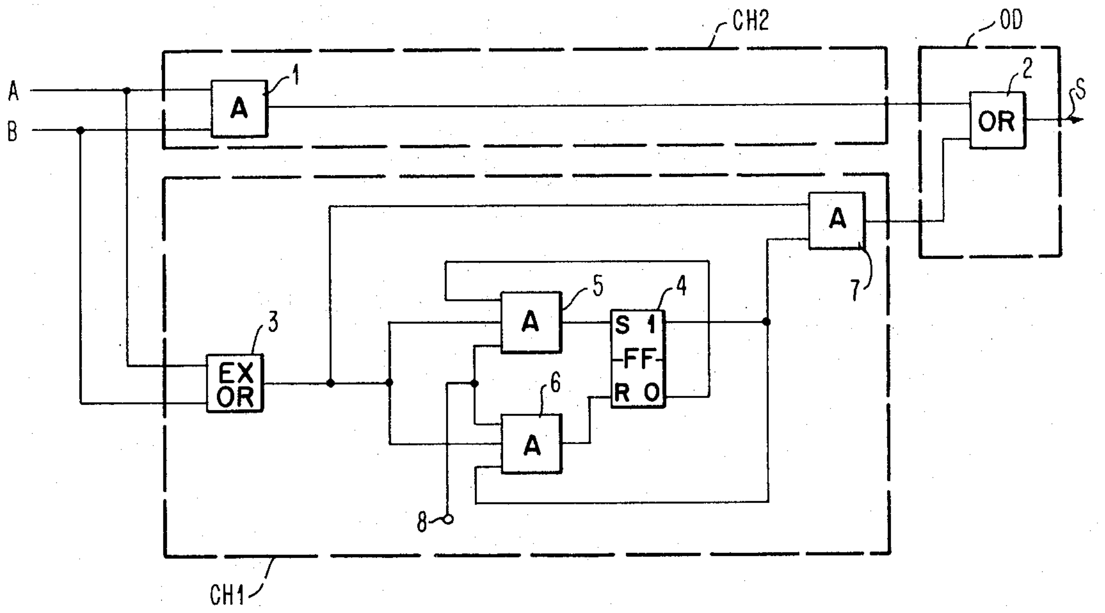
FIG. 2 shows an adding circuit for combining the signals A and B of FIG. 1.

The method according to the invention can be easily understood by referring to the representation of two delta coded signals A and B and their delta coded sum S as shown in FIG. 1. Each time the corresponding bits of signals A and B are one bits, as in bit times *a*, *d*, and *j*, a one bit is generated; i.e., the half sum of the two bits is generated since instead of a two step increase corresponding to the sum, a one step increase is performed. Each time the corresponding bits of signals A and B are zero bits, as in *c*, *g*, and *k*, a zero bit is generated; i.e., again the half sum. And finally, each time the corresponding bits of signals A and B mismatch, zero and one bits are alternately supplied as shown in bit times *b*(bit 1), *e*(bit 0), *f*(bit 1), *h*(bit 0), *i*(bit 1) and *l*(bit 0). The succession of zero and one bits corresponds to a succession of increases and decreases in the amplitude of the analog sum signal which is equivalent to the indication of maintaining the signal at a constant amplitude. In this way the bit generated for a mismatch will have no influence on the amplitude of the sum signal as soon as the bit corresponding to the next mismatch is generated. The probability of having successive mismatching bits over a period of time, e.g., eight bit times is high. Therefore, the increases from one bits are quickly counterbalanced by decreases from zero bits. This can perhaps be better understood by reference to the following example:

Reference will be now made to FIG. 2 which shows a preferred embodiment of an adding circuit according to the invention. In general, an embodiment of the invention comprises two channels CH1, CH2, and an output device OD such as an OR circuit. The first or mismatch channel CH1 supplies a delta coded signal when the bits of the two delta coded signals A and B mismatch, and the second or match channel CH2 supplies another delta coded signal when the bits of signals A and B match. The first and second channels receive the two delta coded signals A and B and their outputs are connected to the output device OD which provides an output which is the coded sum signal S. The sequence of one and zero bits constituting the delta coded sum signal S results in the serialization of the one and zero bits generated by the first and second channels CH1, CH2, during successive bit times. The serialization is done by the output device OD.

In order to provide a one bit or a zero bit when there is a mismatch, the channel comprises an actuating device in the form of EXCLUSIVE OR gate 3, which controls addressing means in the form of two AND gates 5 and 6 and a memory circuit which can be in the form of a flip flop 4.

The two delta coded signals A and B are provided at the two inputs of the EXCLUSIVE OR gate 3. The output of the EXCLUSIVE OR gate 3 is connected to the first input of the three inputs of AND gate 5 and of AND gate 6, and to one of the two inputs of AND gate 7. AND gates 5 and 6 have their second input connected to terminal 8 which is in turn, connected to a clock or the like (not shown) to provide a source of timing pulses. The pulse rate of said clock is equal to the bit rate of the delta coded signals A and B to be added. The third input of AND gate 5 is connected to the zero output of flip flop 4, and the third input of AND gate 6 is connected to the one output of flip flop 4. The output of AND gate 5 is connected to the set input S of the flip flop 4, and the output of AND gate 6 is connected to the reset input R of flip flop 4. This is a conventional way of connecting two AND gates and a flip flop to obtain a binary decision circuit. In such a circuit, there is always one of the outputs of flip flop 4 which is active and therefore there is always one of the first inputs of AND gates 5 and 6 which is activated. Each time the EXCLUSIVE OR gate 3 and the timing clock generate a pulse at the same time, one of the AND gates 5 and 6 will be conductive and therefore the flip flop 4 will change of state.

The outputs one and zero of the flip flop 4 will be alternately active, which means that the output one will have alternately a high and a low level. This output is connected to the AND circuit 7 and will consequently generate, alternately, the two levels corresponding to one bits and zero bits generated by the mismatch channel CH1. Also the flip flop 4 keeps track of the last bit it has generated, i.e., if the level of the output one is high, this means that a one bit has been generated the preceding time the flip flop changed state. This flip flop 4 is therefore a memory device generating and recording the value of the last bit generated by the mismatch channel CH1.

It is well recognized by those skilled in the art of logic circuits that SR flip flop 4 and AND gates 5 and 6 could be replaced by a JK flip flop having Harper gates to obtain the binary decision circuit of channel CH1.

The match channel CH2 comprises AND gate 1 which receives the two delta coded signals A and B to be added. The output of AND gate 1 is the output of channel CH2.

The output device OD comprises in the specific embodiment described, OR gate 2 which has two inputs for receiving the output signals from channels CH1 and CH2. The outputs of AND gates 1 and 7 are connected to the inputs of OR gate 2. The OR gate 2 performs the serialization of the one and zero bits generated by channels CH1 and CH2 to provide signal S.

OPERATION

The operation of the adding circuit will now be described by reference to FIGS. 1 and 2. Two situations may arise. Either the corresponding bits of signals A and B match as in bit time "*a*" (when the bit is signal A and the bit in signal B are one bits) or "*c*" (when the bit in signal A and the bit in signal B are zero bits), or the corresponding bits of signals A and B mismatch as in bit time "*b*" (when signal A is a one bit and signal B is a zero bit) or "*f*" (when signal A is a zero bit and signal B is a one bit).

When signal A = signal B = 1, or when signal A = signal B = 0, the output of EXCLUSIVE OR gate 3 does not provide a signal to the addressing means and to AND gate 7. The mismatch channel CH1 is therefore at rest. Still considering when the bits of signals A and B are both either zero or one, AND gate 1 supplies either a zero bit or a one bit respectively and the match channel CH2 becomes active and provides an output to the output device OD either a bit one or a bit zero.

If the bits of signals A and B are mismatched, the output of AND gate 1 does not result in a change of state and therefore the match channel CH2 is at rest. The output of EXCLUSIVE OR gate 3 is now active which causes AND gate 7 to become conductive, and the addressing means to trigger the memory circuit comprising flip flop 4. The binary signal supplied by the flip flop 4 is transmitted to AND gate 7 which conducts, and provides the output of the mismatch channel. The output is applied to the output device OD. Due to the connection of the addressing means (AND gates 5 and 6) to the memory circuit (flip flop 4), this latter supplies, in turn, one and zero bits for each mismatch of the signals A and B. For instance, referring to FIG. 1, a one bit is supplied during bit time "*b*", a zero bit is supplied during bit time "*e*", a one bit is supplied during bit time "*f*" and so on.

The delta coded sum signal S at the output of the OR gate 2 is therefore made up of the succession of signals received from the mismatch and match channel.

It should be noted that the half sum signal S is equal to half of the sum of signals A and B. The half sum is important because it allows the signal A and B to be delta modulated at amplitudes corresponding to the saturation limit of the delta modulators thereby giving the best signal to noise ratio. Use of the half sum provides an output half sum signal S which does not exceed the limit of saturation even when signals A and B have been modulated at the saturation point of their data modulators.

This results in the best possible signal to noise ratio at the output.

While the invention has been particularly shown and described with reference to a preferred embodiment thereof, it will be understood by those skilled in the art that various changes in form and detail may be made therein without departing from the spirit of the invention.

For example, while the invention has been described with reference to the so-called delta modulation technique, it should be recognized that this invention is also applicable to any binary signals. In like manner, it should be recognized that the digital logic circuits implementing the method of this invention could be replaced by their equivalents such as by implementing the binary decision circuit of channel CH1 with a Harper gate flip flop.

What is claimed is:

1. An adding circuit to add two data coded signals having the same binary bit rate to provide an output sum signal at the same binary bit rate as the two signals comprising:

mismatch channel means receiving the two signals to be added and generating a bit of one value during a bit time where bits of the two signals to be added are different and alternately generating a bit of another value during a next bit time where bits of the two signals to be added are different;

match channel means receiving the two signals to be added and generating, a one bit each time bits at corresponding bit times of the two signals to be added are one bits, and a zero bit each time bits at corresponding bit times of the two signals to be added are zero bits; and an output device connected to an output of the mismatch channel means and an output of the match channel means for generating the output sum signal.

2. An adding circuit as claimed in claim 1 to add two delta coded signals having the same binary bit rate to provide an output delta coded sum signal wherein the mismatch channel means comprises:

actuating means receiving the two delta coded signals to be added and generating a bit each time the bits of said delta coded signals are different;

a memory circuit generating and recording a value of a last bit generated by the mismatch channel means, and addressing means connected to the actuating means and to the memory means for modifying the information recorded in the memory device, whenever a bit is received from the actuating means.

3. An adding circuit as claimed in claim 2 in which the actuating means is an EXCLUSIVE OR gate generating a bit each time corresponding bits of the two delta coded signals to be added are different.

4. An adding circuit as claimed in claim 2 in which the memory circuit is a flip flop generating alternately one bits and zero bits which are the output signals of the mismatch channel means and staying in the state corresponding to the type of bit which has been generated.

5. An adding circuit as claimed in claim 2 in which the addressing means comprises two AND gates connected to the memory circuit to form with said memory circuit, a binary decision logic circuit, the two AND gates being responsive to a signal generated by the actuating means and to timing pulses having a rate which is equal to a rate of the delta coded signals to be added.

6. An adding circuit as claimed in claim 2 which comprises:

an EXCLUSIVE OR gate receiving the two delta coded signals to be added and generating a bit each time corresponding bits of the delta coded signals are different;

a flip flop generating alternately a one bit and a zero bit which are output signals of the mismatch channel means, and staying in a state corresponding to a type of bit which has been generated during a preceding mismatch of the two delta coded signals to be added; and two AND gates connected to the flip flop to form a binary decision logic circuit, the AND gates also being connected to the EXCLUSIVE OR gate and responsive to bits generated by the EXCLUSIVE OR gate and to timing pulses having a rate which is equal to a rate of the two delta coded signals to be added.

7. An adding circuit as claimed in claim 6 wherein:

the match channel means is an AND gate for receiving two delta coded signals to be added and generating the output signal of said match channel means, and;

the output device is an OR gate connected to the output of the mismatch channel means and the output of the match channel means for generating the output delta coded sum signal.

8. An adding circuit as claimed in claim 2 in which the match channel means is an AND gate receiving the two delta coded signals to be added and generating the output signal of said match channel means.

9. An adding circuit as claimed in claim 2 in which the output device is an OR gate connected to the output of the mismatch channel means and the output of the match channel means and generating the output delta coded signal.

* * * * *

PO-1050
(5/69)

UNITED STATES PATENT OFFICE
CERTIFICATE OF CORRECTION

Patent No. 3,764,792 Dated Oct. 9, 1973

Inventor(s) Christian A. Jacquart

It is certified that error appears in the above-identified patent and that said Letters Patent are hereby corrected as shown below:

Claim 1, Column 5, line 52, after "two" delete "data" and insert --delta--.

Signed and sealed this 19th day of March 1974.

(SEAL)
Attest:

EDWARD M.FLETCHER,JR.
Attesting Officer

C. MARSHALL DANN
Commissioner of Patents